United States Patent
Fluckiger

(10) Patent No.: US 9,354,489 B2
(45) Date of Patent: May 31, 2016

(54) ROBUST AUTOFOCUS ALGORITHM FOR MULTI-SPECTRAL IMAGING SYSTEMS

(71) Applicant: RAYTHEON COMPANY, Waltham, MA (US)

(72) Inventor: David U. Fluckiger, Allen, TX (US)

(73) Assignee: Raytheon Company, Waltham, MA (US)

(*) Notice: Subject to any disclaimer, the term of this patent is extended or adjusted under 35 U.S.C. 154(b) by 178 days.

(21) Appl. No.: 14/177,175

(22) Filed: Feb. 10, 2014

(65) Prior Publication Data

US 2015/0227022 A1  Aug. 13, 2015

(51) Int. Cl.
G03B 13/36 (2006.01)
H04N 5/232 (2006.01)

(52) U.S. Cl.
CPC ............ G03B 13/36 (2013.01); H04N 5/23212 (2013.01)

(58) Field of Classification Search
CPC ............................ G03B 13/36; H04N 5/23212
USPC .................................................. 348/345, 349
See application file for complete search history.

(56) References Cited

U.S. PATENT DOCUMENTS

| | | | |
|---|---|---|---|
| 4,490,814 A | 12/1984 | Shenk | |
| 5,170,202 A | 12/1992 | Bell | |
| 5,416,518 A | 5/1995 | Lee et al. | |
| 5,477,271 A | 12/1995 | Park | |
| 5,569,904 A | 10/1996 | Meyers | |
| 5,604,538 A | 2/1997 | Kaneda et al. | |
| 5,619,260 A | 4/1997 | Miyadera | |
| 5,623,707 A | 4/1997 | Kusaka | |
| 5,732,288 A | 3/1998 | Muramatsu | |
| 5,745,175 A | 4/1998 | Anderson | |
| 5,752,115 A | 5/1998 | McIntyre et al. | |
| 7,697,831 B1 | 4/2010 | Tsai et al. | |

(Continued)

FOREIGN PATENT DOCUMENTS

| | | |
|---|---|---|
| EP | 2214139 A1 | 8/2010 |
| EP | 2448246 A1 | 5/2012 |

OTHER PUBLICATIONS

Krotov, E., "Focusing", International Journal of Coomputer Vision, Kluwer Academic Publishers, Norwell, U.S., vol. 1, No. 3, Jan. 1, 1987, pp. 223-237.

(Continued)

*Primary Examiner* — Nhan T Tran
*Assistant Examiner* — Chan Nguyen
(74) *Attorney, Agent, or Firm* — Burns & Levinson LLP; Joseph M. Maraia

(57) ABSTRACT

An autofocus metric approach for focusing video images, automatically, based on images taken during a focus sweep in which a focus cell is repositioned for each of the images is provided. The approach includes, given an edge detected image from the focus sweep and an associated focus cell position in the focus sweep, an autofocus engine dividing the edge detected image into sub-images. For each sub-image, the autofocus engine calculates a normalized edge detection strength and compares it to a threshold. Based on the comparison, the autofocus engine determines whether an edge is present in the sub-image. Based on the determinations of edges in the sub-images, the autofocus engine calculates an autofocus metric associated with the given focus cell position. The autofocus engine provides the autofocus metric together with autofocus metrics associated with other focus cell positions to focus the video images.

20 Claims, 7 Drawing Sheets

(56) References Cited

U.S. PATENT DOCUMENTS

| | | |
|---|---|---|
| 2003/0151674 A1 | 8/2003 | Lin |
| 2004/0223073 A1 | 11/2004 | Kanai |
| 2005/0280735 A1 | 12/2005 | Nakahara |
| 2006/0029284 A1* | 2/2006 | Stewart .................. G02B 7/365 |
| | | 382/255 |
| 2009/0079862 A1 | 3/2009 | Subbotin |
| 2011/0058096 A1 | 3/2011 | Chou et al. |
| 2011/0199534 A1* | 8/2011 | Kawai .................... G02B 7/365 |
| | | 348/345 |
| 2011/0273610 A1* | 11/2011 | Tay ......................... G06T 5/003 |
| | | 348/345 |
| 2012/0188408 A1 | 7/2012 | Nakaoka |
| 2012/0242856 A1* | 9/2012 | Tay .................... H04N 5/23212 |
| | | 348/222.1 |
| 2012/0320230 A1 | 12/2012 | Uehara |
| 2013/0135492 A1* | 5/2013 | Ikeda ..................... H04N 5/225 |
| | | 348/222.1 |

OTHER PUBLICATIONS

Sang-Yong Lee, et al., "Enhanced Autofocus Algorithm Using Robust Focus Measure and Fuzzy Reasoning", IEEE Transactions on Circuits and Systems for Video Technology, IEEE Service Center, Piscataway, NJ, U.S., vol. 18, No. 9, Sep. 1, 2008.

* cited by examiner

ROBUST AUTOFOCUS ALGORITHM FOR MULTI-SPECTRAL IMAGING SYSTEMS

GOVERNMENT SUPPORT

The invention was supported, in whole or in part, by a grant Withheld from U.S. Government Agency. The Government has certain rights in the invention.

BACKGROUND

Autofocus systems rely on one or more sensors to determine correct focus. Data collected from an autofocus sensor is used to control an electromechanical system that adjusts the focus of an optical system of a camera. When an image is taken of a subject that is on the ground by the camera that is also on the ground, the subject may in focus while the background is out of focus. This is because the range from the camera and to the subject is different than the range from the camera to the background. In an air-to-ground application, ranges from an airborne camera to the ground and to people and objects on the ground are nearly the same. As such, the challenge to autofocusing images taken from the air is focusing the entire image and not just a portion. Other challenges, which are particularly prevalent to surveillance applications, include autofocusing images quickly and low light conditions.

SUMMARY

In accordance with an example, a method for focusing video images, automatically, based on images taken during a focus sweep in which a focus cell is repositioned for each of the images is provided. The method includes, in an autofocus engine, given an edge detected image from a focus sweep and an associated position of a focus cell in the focus sweep, dividing the edge detected image into sub-images. The method further includes for each sub-image, calculating a normalized edge detection strength of a subject sub-image and comparing the normalized edge detection strength of the subject sub-image to a threshold. The method further includes determining, based on the comparison, an edge is present in the subject sub-image and calculating, based on the determinations of edges in the sub-images, an autofocus metric associated with the given position of the focus cell. The method further includes providing the autofocus metric together with autofocus metrics associated with other positions of the focus cell to focus video images.

In accordance with another example, a system for focusing video images, automatically, based on images taken during a focus sweep in which a focus cell is repositioned for each of the images is provided. The system includes memory having computer executable instructions thereupon and at least one interface receiving an edge detected image from a focus sweep and an associated position of a focus cell in the focus sweep. The system further includes an autofocus engine coupled to the memory and the at least one interface. The computer executable instructions, when executed by the autofocus engine, cause the autofocus engine to divide the edge detected image into sub-images. The autofocus engine further caused to calculate, for each sub-image, a normalized edge detection strength of a subject sub-image and compare the normalized edge detection strength of the subject sub-image to a threshold. The autofocus engine further caused to determine, based on the comparison, an edge is present in the subject sub-image and to calculate, based on the determinations of edges in the sub-images, an autofocus metric associated with the given position of the focus cell. The autofocus engine further caused to provide the autofocus metric together with autofocus metrics associated with other positions of the focus cell to focus video images.

In accordance with yet another example, a tangible computer-readable storage medium having computer readable instructions stored therein for focusing video images, automatically, based on images taken during a focus sweep in which a focus cell is repositioned for each of the images is provided. The computer readable instructions, when executed by one or more processors, cause the one or more processors to, given an edge detected image from a focus sweep and an associated position of a focus cell in the focus sweep, divide the edge detected image into sub-images. The one or more processors further caused to calculate, for each sub-image, a normalized edge detection strength of a subject sub-image and compare the normalized edge detection strength of the subject sub-image to a threshold. The one or more processors further caused to determine, based on the comparison, an edge is present in the subject sub-image and to calculate, based on the determinations of edges in the sub-images, an autofocus metric associated with the given position of the focus cell. The one or more processors further caused to provide the autofocus metric together with autofocus metrics associated with other positions of the focus cell to focus video images.

In some examples, any of the aspects above can include one or more of the following features.

In other examples of the method, calculating the normalized edge detection strength of the subject sub-image having pixel values includes selecting a maximum pixel value found in the subject sub-image and a minimum pixel value found in the subject sub-image. The examples of the method further include forming a ratio of a difference of the maximum pixel value and minimum pixel value to a sum of the maximum pixel value and minimum pixel value, the ratio being a contrast measure, and multiplying the contrast measure with a mean of the pixel values in the sub-image resulting in a normalized and weighted edge detection strength of the subject sub-image.

In some examples of the method, calculating the autofocus metric includes averaging the normalized edge detection strengths of sub-images having edges present.

Other examples of the method further include selecting a position of the focus cell based on the autofocus metrics and repositioning the focus cell to the selected position to focus the video images.

In some examples of the method, selecting the position of the focus cell includes creating a model of autofocus metrics and positions of the focus cell from the calculated autofocus metrics and associated positions of the focus cell and selecting a best position of the focus cell from the model.

In other examples of the method, the model is a non-linear regression fit of the calculated autofocus metrics to the model.

Some examples of the method further include for each image taken during a focus sweep, cropping a subject image into a region of interest and reducing white noise of the region of interest resulting in a filtered image. The examples of the method further include detecting edges in the filtered image resulting in an edge detected image associated with a position of the focus cell in the focus sweep.

Other examples of the method further include capturing images, during a focus sweep, in wavelengths selected from a group consisting of Day Television (DTV), Near Infrared (NIR), SWIR-Short Wave Infrared (SWIR), Mid Wave Infrared (MWIR), and Long Wave Infrared (LWIR).

These and other features and characteristics, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of claims. As used in the specification and in the claims, the singular form of "a", "an", and "the" include plural referents unless the context clearly dictates otherwise.

BRIEF DESCRIPTION OF THE DRAWINGS

The foregoing and other objects, features and advantages will be apparent from the following more particular description of the examples, as illustrated in the accompanying drawings in which like reference characters refer to the same parts throughout the different views. The drawings are not necessarily to scale, emphasis instead being placed upon illustrating the principles of the examples.

DETAILED DESCRIPTION

Figure 1:
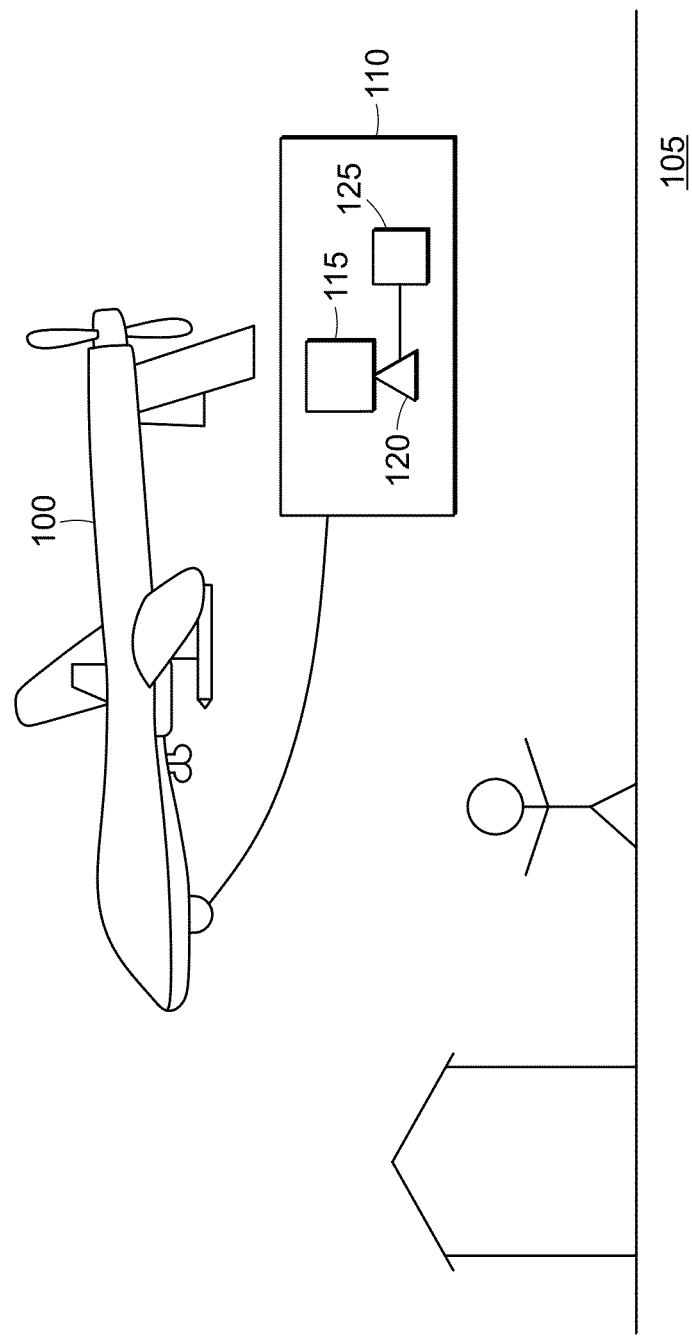
FIG. 1 is a block diagram of an example imaging system with an autofocus engine.

In the description that follows, like components have been given the same reference numerals, regardless of whether they are shown in different examples. To illustrate an example (s) of the present disclosure in a clear and concise manner, the drawings may not necessarily be to scale and certain features may be shown in somewhat schematic form. Features that are described and/or illustrated with respect to one example may be used in the same way or in a similar way in one or more other examples and/or in combination with or instead of the features of the other examples.

FIG. 1 shows an example of an aerial imaging platform 100 (e.g., a drone) flying over the ground 105 and performing surveillance. The aerial imaging platform 100 has an imaging system 110 for surveying people and objects on the ground 105. The imaging system 110 includes an imaging sensor 115, focus cell 120, and autofocus engine 125. The imaging sensor 115 take images, for example, video images in the wavelengths of Day Television (DTV), Near Infrared (NIR), SWIR-Short Wave Infrared (SWIR), Mid Wave Infrared (MWIR), or Long Wave Infrared (LWIR).

The focus cell 120 focuses the images taken by the image sensor 115. The focus cell 120 is configured to change positions with each focus cell position focusing an image differently. This is known as a "focus sweep." The autofocus engine 125 controls the position of the focus cell 120 by providing the focus cell 120 with a selected focus cell position. The autofocus engine 125, itself, may be controlled by an operator (e.g., the operator of the drone 100). In a "push-to-focus" application, the operator, wanting to focus an out of focus image, pushes a button and the autofocus engine 125 focuses the image.

In an autofocus metric approach (and its examples described herein), the autofocus computes an autofocus metric associated with each focus cell position and selects the best focus cell position based on the computed metrics. Operation of the autofocus engine 125 implementing examples of the autofocus metric approach are described below with reference to FIGS. 2A-2C.

Figure 2A:
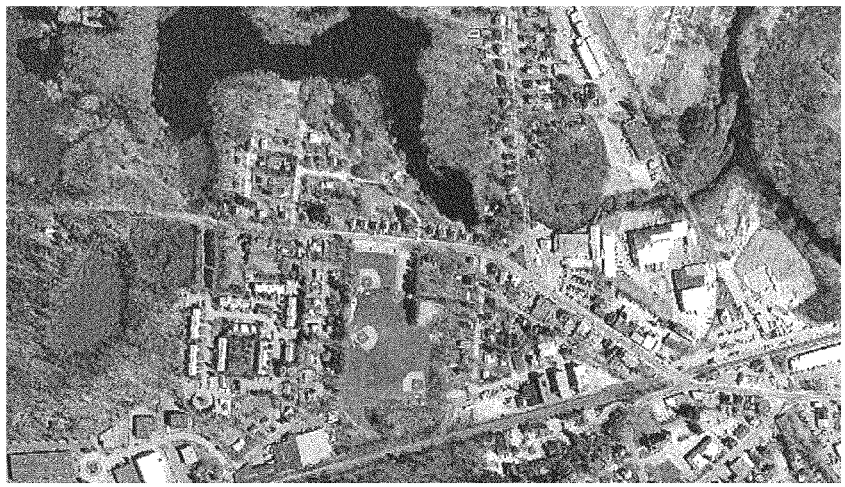
FIGS. 2A-2C are example images showing operation of the autofocus engine implementing an example of the autofocus metric approach.
Figure 2A:
Figure 2B:
Figure 2B:
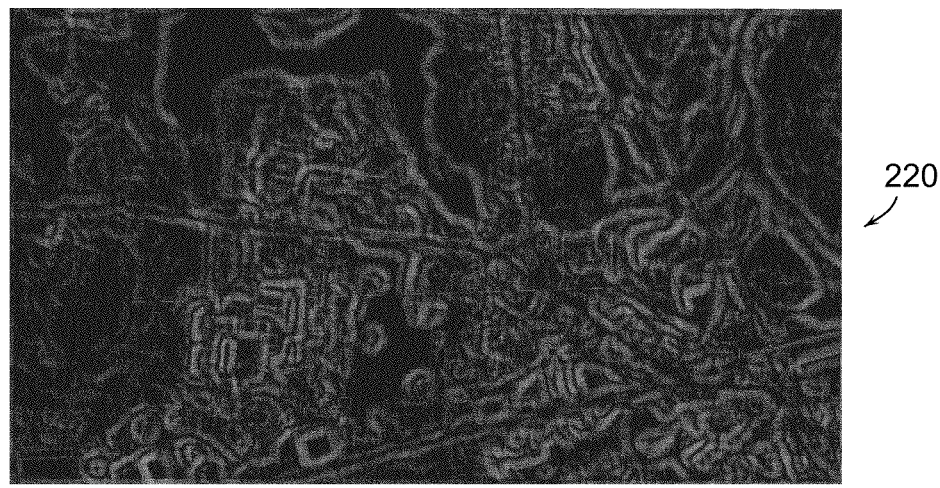

FIG. 2A shows a first image 205 taken at a first position of the focus cell 120 and a second image 210 taken at a second focus cell position different from the first focus cell position. The first and second images 205, 210 are two of several images taken at different focus cell positions during a focus sweep. An edge detector processes the first image 205 and second image 210 resulting in an edge detected first image 215 and edge detected second image 220, respectively, shown in FIG. 2B. Any one of a number of edge detectors maybe used, for example, a Sobel edge detector. For the sake of describing examples of the autofocus metric approach and for readability, the edge detected first image 215 is referred to as the "in-focus-image" and the edge detected second image 220 is referred to as the "out-of-focus-image."

The autofocus image divides the in-focus-image 215 and the out-of-focus-image 220 into sub-images 225, 230 called "patches." In a convenient example of the autofocus metric approach, the size of the patches is selected so that each patch contains one or zero detected edges. In another example, the size of the patches is selected to reduce the impact of glints/ bright lights in low flux (light) conditions.

Before continuing the explanation of the autofocus metric approach, consider an example of an image in which a portion of an image has high contrast. Because of this high contrast area, a high edge detection strength may be calculated for an otherwise out-of-focus-image. In turn, this may lead to the wrong conclusion that the image is in focus when it is not. In other words, the edge detection strength calculation may be dominated by a portion of an image and may not be representative of the entire image. This condition is not desirable and it can defeat conventional autofocus approaches.

To reduce dependence on parts of an image that have high contrast but do not have edges and on other parts that are benign, the autofocus engine 125 (FIG. 1) divides the in-focus-image 215 and the out-of-focus-image 220 into sub-images 225, 230 called "patches." The autofocus engine 125 then assigns a "local" edge detection strength (edge contrast) to each patch. The autofocus engine 125 derives an autofocus metric based on these local values for the sub-images. In contrast, conventional autofocus approaches based contrast enhancement, derive their metrics from an entire image.

In a convenient example of the autofocus metric approach, the size of the patches is selected so that each patch contains one or zero detected edges. In another example, the size of the patches is selected to reduce the impact of glints/bright lights in low flux (light) conditions. In a yet another convenient example of the autofocus metric approach, given pixel values of a patch, the autofocus engine 125 calculates a normalized edge detection strength for the patch by selecting a maximum pixel value and minimum pixel value found in the patch. The autofocus engine 125 forms a ratio of a difference of the maximum pixel value and minimum pixel value to a sum of the maximum pixel value and minimum pixel value. The ratio is a measure of contrast. The autofocus engine 125 multiplies the contrast measure with a mean of the pixel values in the patch resulting in a normalized and weighted edge detection strength of the patch.

The foregoing action scales all local patch values so that a local 'weak' (low contrast, but sharp) contributes equally to a local 'strong' (high contrast and sharp). A sharp edge is defined as a transition that occurs from a low value region of the image to a high value region in one or a few pixels. The fewer the pixels in the width of the border or transition boundary between a low and high region of the image, the 'sharper' the weight. The goal of focusing is to 'sharpen' all the borders, which is the difference between 'in-focus' and 'out-of-focus' in the usual sense.

The autofocus engine 125 compares the normalized edge detection strength of a given patch with a threshold. Using the threshold, the autofocus engine 125 discriminates between patches with detected edges and patches without detected edges. In some examples of the autofocus metric approach, a user defines the threshold and inputs the threshold in the autofocus engine 125 using an input device such as a keyboard or mouse. In other examples of the autofocus metric approach, the autofocus engine 125 or other component adjusts the threshold based on application.

Figure 2C:
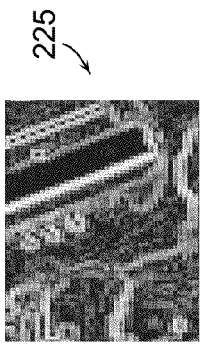
Figure 2C:
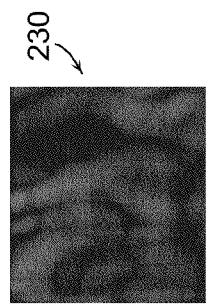
Figure 2C:
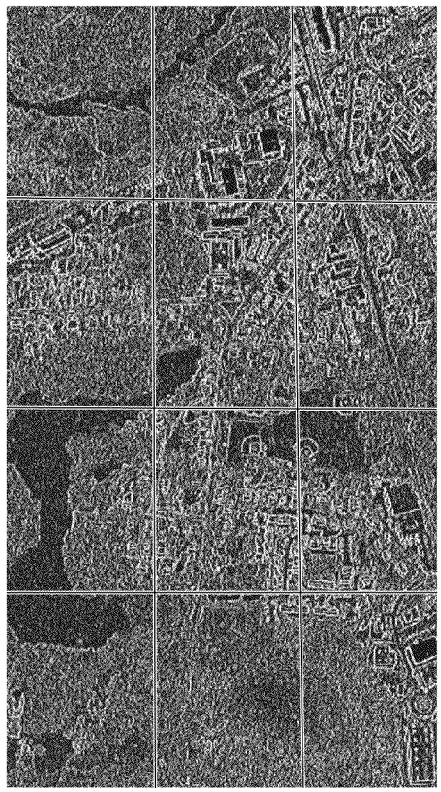

In the example of FIG. 2C, the autofocus engine 125 (FIG. 1) determines that 99% of the patches 225 of the in-focus-image 215 include edges and 1% do not. In comparison, the autofocus engine 125 determines that 20% of the patches 230 of the out-of-focus-image 220 include edges and 80% do not. The autofocus engine 125 computes a first autofocus metric for the first focus cell position based on patches 225 determined to have edges. The autofocus engine 125 computes a second autofocus metric for the second focus cell position based on patches 230 determined to have edges.

The autofocus engine 125 provides the first and second autofocus metrics, and the autofocus metrics calculated for other focus cell positions in the focus sweep to be used in determining the "best" focus cell position. In turn, the focus cell 120 moves to the best focus cell position to focus images. A convenient example of the autofocus engine 125 selects the best focus cell position based on the computed autofocus metrics and associated focus cell positions. (The selection procedure is described in greater detail immediately below.) The autofocus engine 125 repositions the focus cell 120 to the best focus cell position to focus images.

Figure 3A:
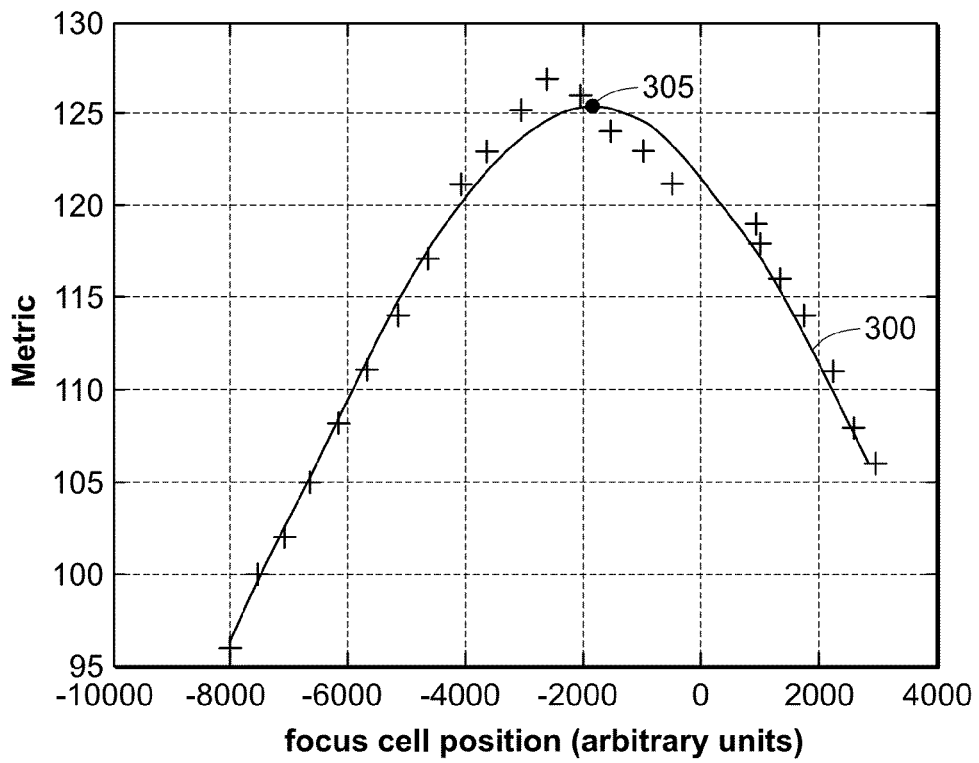
FIGS. 3A and 3B are charts showing selecting the best focus cell position according to an example of the autofocus metric approach.

FIG. 3A shows data points (denoted in the figure as plus signs) generated by the autofocus engine 125 (FIG. 1) as the focus cell 120 (FIG. 1) sweeps from left to right at a constant rate and images are collected at discrete times. Each data point represents an autofocus metric (shown on the Y-axis) calculated for a given focus cell position (shown on the X-axis), as described above with reference to FIGS. 2A-2C.

The autofocus engine 125 creates a model 300 from the autofocus metrics and associated focus cell positions. The model 300 represents how image sharpness (degree of focus) is expected to change as the position of the focus cell 120 changes, based on physics. As such, the model 300 is theoretical. In a convenient example of the autofocus metric approach, the model 300 is a non-linear regression fit. The "peak" of the model, referenced in the figure as 305, represents the best focus cell position. The autofocus engine 125 provides the best focus cell position 305 to the focus cell 120 to focus images.

The number of autofocus metrics (data points) computed by the autofocus engine 125 from which to build the model 300, may be selected based on a region of interest and patch size. A typical patch size of between 7×7 to 20×20 is selected to minimize the number of edges in any patch. Ideally a single patch operates on a single distinctive edge. In a preferred example, a patch size of 10×10 is selected. In some examples of the autofocus metric approach, the number of autofocus metrics computed by the autofocus engine 125 is selected so that the best focus cell position is selected within a certain amount of time, e.g., one second or two seconds. This is particularly advantageous for a "push-to-focus" feature in which an operator expects a blurry image to come into focus shortly after pressing a focus button.

Figure 3B:
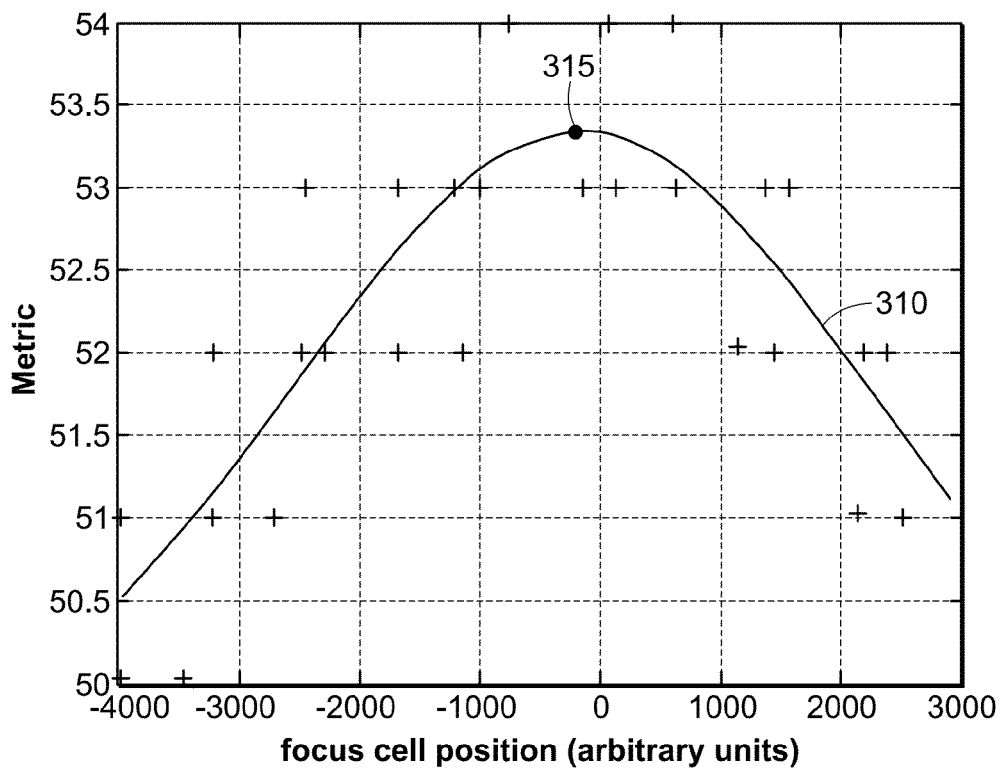

FIG. 3B shows an example of the autofocus metric approach used in a low light imaging condition in which there is very low signal. Such an imaging condition is a challenge for conventional autofocus approaches. The data points are more scattered than compared to the example of FIG. 3A. The increased scattering represents increased noise in the measurements used to calculate autofocus metrics. The autofocus engine 125 (FIG. 1) finds a model 315 (theoretical best curve) that goes through the data points and selects the best focus cell position (shown as reference number 315) from the model 315.

In another example of the autofocus metric approach, for each image taken during a focus sweep, the autofocus engine 125 crops a subject image into a region of interest. Generally, the central portion of an image contains the object of interest. Border regions of the image provide context information. The objective is to have the central region of interest in sharp focus, not to be skewed by border region objects. Beneficially, cropping the image to the central region ensures that the autofocus gives best focus of the central region.

The autofocus engine 125 then reduces the white noise of the region of interest resulting in a filtered image. This denoising procedure reduces the random pixel noise in images taken with low signal. The autofocus engine 125 detects edges in the filtered image, e.g., by applying Sobel or Laplace edge detection. The result is an edge detected image associated with a position of the focus cell 120 in the focus sweep. The autofocus engine 125 computes autofocus metrics from the edge detected, as described above with reference to FIG. 2A-2C.

Figure 4A:
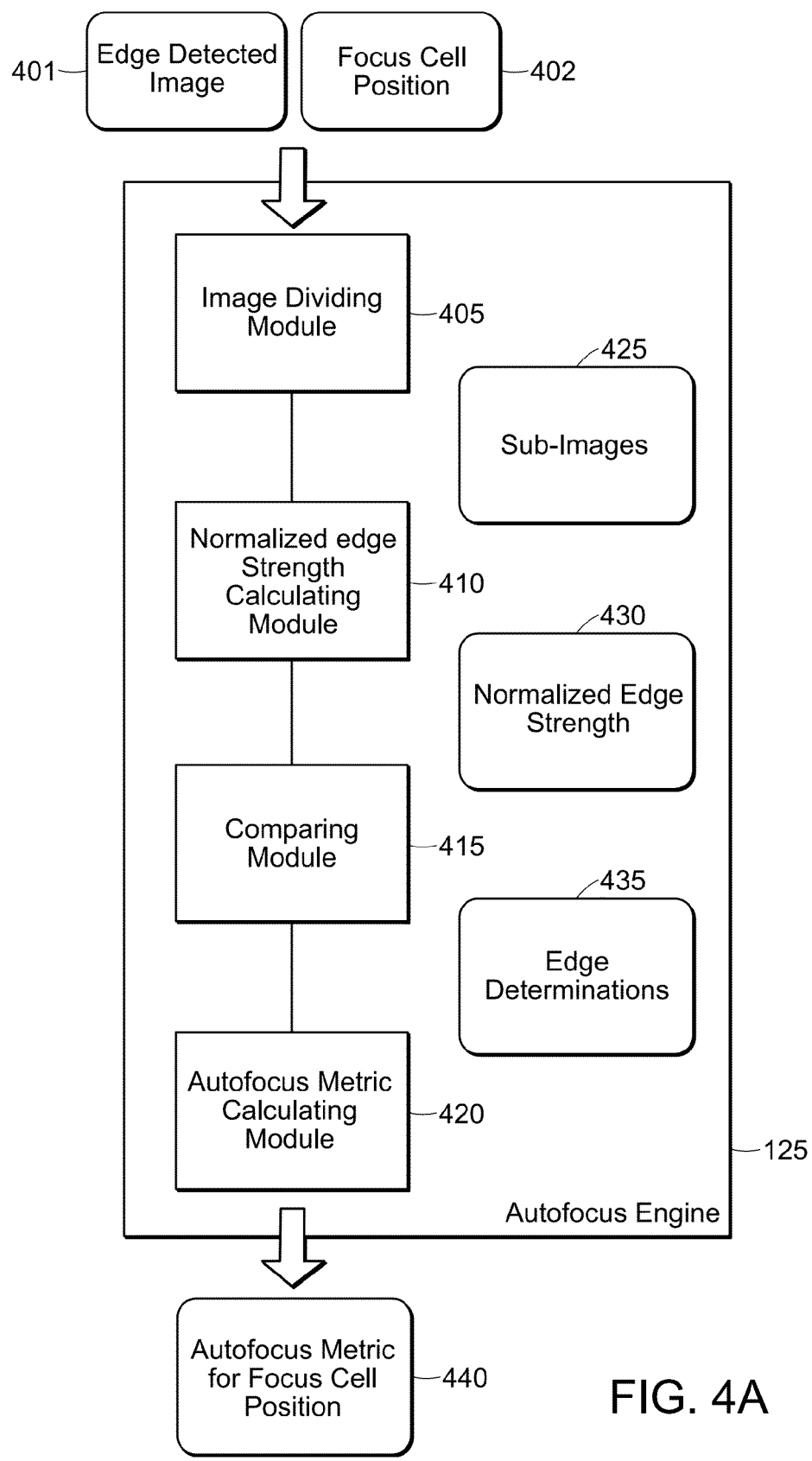
FIG. 4A is a block diagram of an example of the autofocus engine implementing an example of the autofocus metric approach.
Figure 4B:
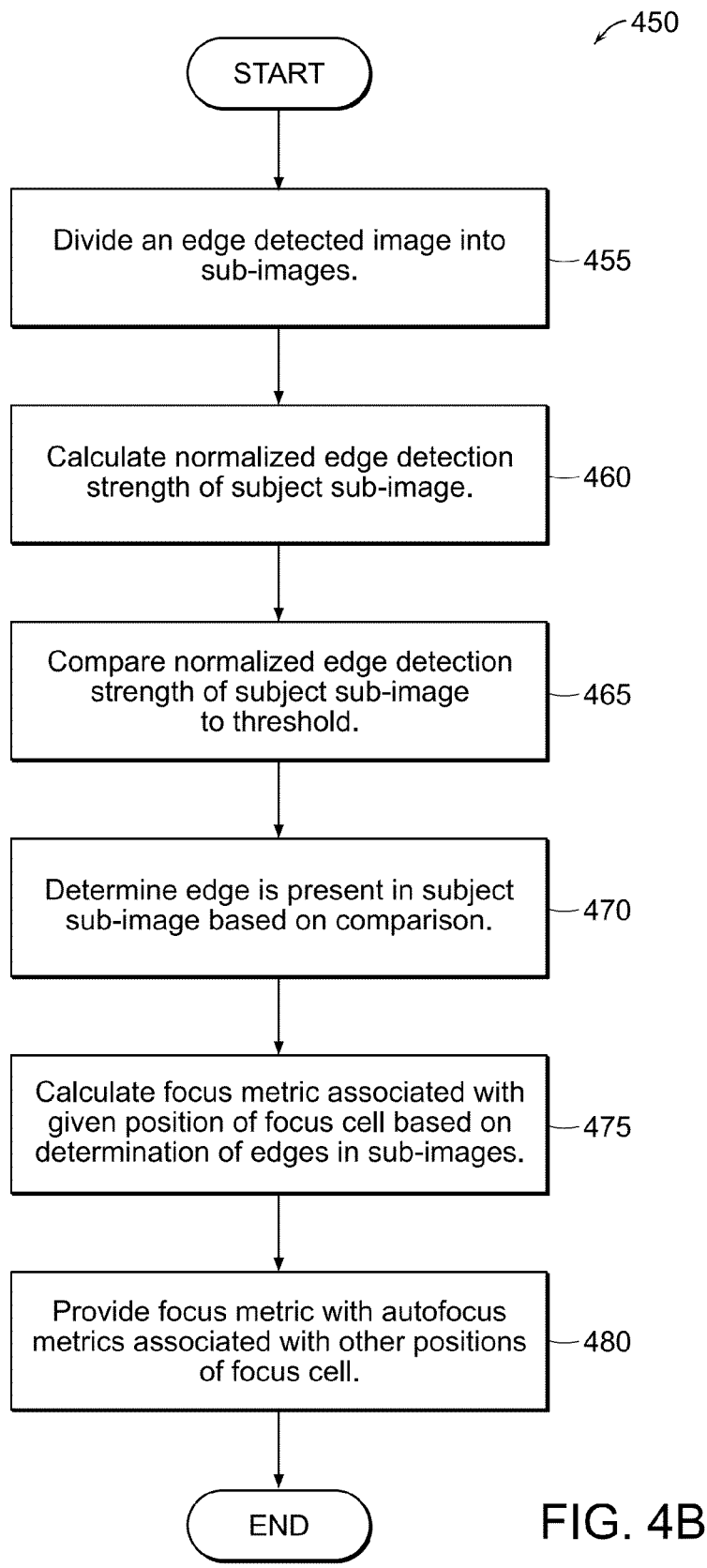
FIG. 4B is a flowchart of an example of the autofocus metric approach.

FIG. 4A shows a convenient example of the autofocus engine 125 (FIG. 1) implementing an example of the autofocus metric approach 450 shown in FIG. 4B. The autofocus engine 125 includes an image dividing module 405, normalized edge strength calculating module 410, comparing module 415, and autofocus metric calculating module 420 each communicatively coupled to the other as shown. It should be appreciated that other examples of the autofocus engine 125 may include more or fewer modules than shown.

Provided with edge detected image 401 and associated focus cell position 402 as input, the image dividing module 405 divides (455) the edge detected image 401 into sub-images 425. For each of the sub-images 425, the normalized edge strength calculating module 410 calculates (460) a normalized edge detection strength 430. The comparing module 415 compares (465) the normalized edge detection strength 411 of a subject sub-image to a threshold.

Based on the comparison, the comparing module 415 determines (470) whether an edge is present in the subject sub-image and provides a determination 435. Based on the determination of an edge 435 in the subject sub image and the determinations of edges in other sub-images, the autofocus metric calculating module 420, calculates (475) an autofocus metric 440 associated with the focus cell position 135. The autofocus engine 125 provides (480) the focus cell position 402 and autofocus metric 440 to focus images.

The above-described systems and methods can be implemented in digital electronic circuitry, in computer hardware, firmware, and/or software. The implementation can be as a computer program product (i.e., a computer program tangibly embodied in an information carrier medium). The implementation can, for example, be in a machine-readable storage device for execution by, or to control the operation of, data processing apparatus. The implementation can, for example, be a programmable processor, a computer, and/or multiple computers.

In one example, a computer program can be written in any form of programming language, including compiled and/or interpreted languages, and the computer program can be deployed in any form, including as a stand-alone program or as a subroutine, element, and/or other unit suitable for use in a computing environment to carry out the features and functions of various examples discussed herein. A computer program can be deployed to be executed on one computer or on multiple computers at one site.

Method steps or operations can be performed as processes by one or more programmable processors executing a computer program to perform functions of various examples by operating on input data and generating output. Method steps can also be performed by and an apparatus can be implemented as special purpose logic circuitry. The circuitry can, for example, be a field programmable gate array (FPGA) and/or an application specific integrated circuit (ASIC). Modules, subroutines, and software agents can refer to portions of the computer program, the processor, the special circuitry, software, and/or hardware that implements that functionality.

The autofocus engine 125 may comprise one or more processors suitable for the execution of a computer program include, by way of example, both general and special purpose microprocessors, and any one or more processors of any kind of digital computer. Generally, a processor receives instructions and data from a read-only memory or a random access memory or both. The elements of a computer may comprise a processor for executing instructions and one or more memory devices for storing instructions and data. Generally, a computer can include, can be operatively coupled to receive data from and/or transfer data to one or more mass storage devices (e.g., a memory module) for storing data (e.g., magnetic, magneto-optical disks, or optical disks). The memory may be a tangible non-transitory computer-readable storage medium having computer-readable instructions stored therein for processing images, which when executed by one or more processors (e.g., autofocus engine 125) cause the one or more processors to carry out or implement the features and functionalities of various examples discussed herein.

Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computing device having a display device. The display device can, for example, be a cathode ray tube (CRT) and/or a liquid crystal display (LCD) monitor, and/or a light emitting diode (LED) monitor. The interaction with a user can, for example, be a display of information to the user and a keyboard and a pointing device (e.g., a mouse or a trackball) by which the user can provide input to the computing device (e.g., interact with a user interface element). Other kinds of devices can be used to provide for interaction with a user. Other devices can, for example, be feedback provided to the user in any form of sensory feedback (e.g., visual feedback, auditory feedback, or tactile feedback). Input from the user can, for example, be received in any form, including acoustic, speech, and/or tactile input.

The above described systems and techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computing device having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system may be coupled to and/or include clients and servers. A client and a server are generally remote from each other and typically interact through a communication network. The relationship of client and server arises by virtue of computer programs running on the respective computing devices and having a client-server relationship to each other.

Communication networks may include packet-based networks, which can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks may include, for example, the public switched telephone network (PSTN), a private branch exchange (PBX), a wireless network (e.g., RAN, Bluetooth, code-division multiple access (CDMA) network, time division multiple access (TDMA) network, global system for mobile communications (GSM) network), and/or other circuit-based networks.

The autofocus engine 125 may include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a World Wide Web browser (e.g., INTERNET EXPLORER® available from Microsoft Corporation, of Redmond, Wash.). The mobile computing device includes, for example, a BLACKBERRY® provided by Research In Motion Limited of Waterloo, Ontario, Canada.

"Comprise," "include," and/or plural forms of each are open ended and include the listed parts and can include additional parts that are not listed. "And/or" is open ended and includes one or more of the listed parts and combinations of the listed parts.

Although the above disclosure discusses what is currently considered to be a variety of useful examples, it is to be understood that such detail is solely for that purpose, and that the appended claims are not limited to the disclosed examples, but, on the contrary, are intended to cover modifications and equivalent arrangements that are within the spirit and scope of the appended claims.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. A method for focusing video images, automatically, based on images taken during a focus sweep in which a focus cell is repositioned for each of the images, the method comprising:
    in an autofocus engine, given an edge detected image from a focus sweep and an associated position of a focus cell in the focus sweep, dividing the edge detected image into sub-images;
    for each sub-image, calculating a normalized edge detection strength of a subject sub-image, wherein calculating the normalized edge detection strength comprises
       selecting a maximum pixel value found in the subject sub-image and a minimum pixel value found in the subject sub-image,
       forming a ratio of a difference of the maximum pixel value and minimum pixel value to a sum of the maximum pixel value and minimum pixel value, the ratio being a contrast measure, and
       multiplying the contrast measure with a mean of the pixel values in the sub-image resulting in a normalized and weighted edge detection strength of the subject sub-image;
    comparing the normalized edge detection strength of the subject sub-image to a threshold;
    determining, based on the comparison, an edge is present in the subject sub-image;
    calculating, based on the determinations of edges in the sub-images, an autofocus metric associated with the given position of the focus cell; and
    providing the autofocus metric together with autofocus metrics associated with other positions of the focus cell to focus video images.

2. The method of claim 1 wherein calculating the autofocus metric includes averaging the normalized edge detection strengths of sub-images having edges present.

3. The method of claim 1 further comprising:
    selecting a position of the focus cell based on the autofocus metrics; and
    repositioning the focus cell to the selected position to focus the video images.

4. The method of claim 3 wherein selecting the position of the focus cell includes:
    creating a model of autofocus metrics and positions of the focus cell from the calculated autofocus metrics and associated positions of the focus cell; and
    selecting a best position of the focus cell from the model.

5. The method of claim 4 wherein the model is a non-linear regression fit of the calculated autofocus metrics to the model.

6. The method of claim 1 further comprising capturing images, during a focus sweep, in wavelengths selected from a group image sensors consisting of Day Television (DTV), Near Infrared (NIR), SWIR-Short Wave Infrared (SWIR), Mid Wave Infrared (MWIR), and Long Wave Infrared (LWIR).

7. A method for focusing video images, automatically, based on images taken during a focus sweep in which a focus cell is repositioned for each of the images, the method of claim 1 further comprising:
    in an autofocus engine, given an edge detected image from a focus sweep and an associated position of a focus cell in the focus sweep, dividing the edge detected image into sub-images;
    for each sub-image, calculating a normalized edge detection strength of a subject sub-image;
    comparing the normalized edge detection strength of the subject sub-image to a threshold;
    determining, based on the comparison, an edge is present in the subject sub-image;
    calculating, based on the determinations of edges in the sub-images, an autofocus metric associated with the given position of the focus cell;
    providing the autofocus metric together with autofocus metrics associated with other positions of the focus cell to focus video images;
    for each image taken during a focus sweep, cropping a subject image into a region of interest;
    reducing white noise of the region of interest resulting in a filtered image; and
    detecting edges in the filtered image resulting in an edge detected image associated with a position of the focus cell in the focus sweep.

8. The method of claim 7 wherein reducing white noise includes applying a bilateral or median filter to pixels of the region of interest.

9. The method of claim 7 wherein detecting edges includes applying Sobel or Laplace edge detection.

10. The method of claim 7, wherein calculating the autofocus metric includes averaging the normalized edge detection strengths of sub-images having edges present.

11. The method of claim 7, further comprising:
    selecting a position of the focus cell based on the autofocus metrics; and
    repositioning the focus cell to the selected position to focus the video images.

12. The method of claim 11, wherein selecting the position of the focus cell includes:
    creating a model of autofocus metrics and positions of the focus cell from the calculated autofocus metrics and associated positions of the focus cell; and
    selecting a best position of the focus cell from the model.

13. The method of claim 12, wherein the model is a non-linear regression fit of the calculated autofocus metrics to the model.

14. The method of claim 7, further comprising capturing images, during a focus sweep, in wavelengths selected from a group image sensors consisting of Day Television (DTV), Near Infrared (NIR), SWIR-Short Wave Infrared (SWIR), Mid Wave Infrared (MWIR), and Long Wave Infrared (LWIR).

15. A system for focusing video images, automatically, based on images taken during a focus sweep in which a focus cell is repositioned for each of the images, the system comprising:
    a memory having computer executable instructions thereupon;
    at least one interface receiving an edge detected image from a focus sweep and an associated position of a focus cell in the focus sweep;

an autofocus engine coupled to the memory and the at least one interface, the computer executable instructions when executed by the autofocus engine cause the autofocus engine to:

divide the edge detected image into sub-images;

for each sub-image, calculate a normalized edge detection strength of a subject sub-image, wherein the autofocus engine is configured to calculate the normalized edge detection strength by selecting a maximum pixel value found in the subject sub-image and a minimum pixel value found in the subject sub-image, forming a ratio of a difference of the maximum pixel value and minimum pixel value to a sum of the maximum pixel value and minimum pixel value, the ratio being a contrast measure, and multiplying the contrast measure with a mean of the pixel values in the sub-image resulting in a normalized and weighted edge detection strength of the subject sub-image;

compare the normalized edge detection strength of the subject sub-image to a threshold;

determine, based on the comparison, an edge is present in the subject sub-image;

calculate, based on the determinations of edges in the sub-images, an autofocus metric associated with the given position of the focus cell; and provide the autofocus metric together with autofocus metrics associated with other positions of the focus cell to focus video images.

16. The system of claim 15, wherein the computer executable instructions when executed by the autofocus engine additionally cause the autofocus engine to:

for each image taken during a focus sweep, crop a subject image into a region of interest;

reduce white noise of the region of interest resulting in a filtered image; and detect edges in the filtered image resulting in an edge detected image associated with a position of the focus cell in the focus sweep.

17. A tangible non-transitory computer-readable storage medium having computer readable instructions stored therein for focusing video images, automatically, based on images taken during a focus sweep in which a focus cell is repositioned for each of the images, which when executed by one or more processors cause the one or more processors to:

given an edge detected image from a focus sweep and an associated position of a focus cell in the focus sweep, divide the edge detected image into sub-images;

for each sub-image, calculate a normalized edge detection strength of a subject sub-image, wherein calculating the normalized edge detection strength comprises selecting a maximum pixel value found in the subject sub-image and a minimum pixel value found in the subject sub-image, forming a ratio of a difference of the maximum pixel value and minimum pixel value to a sum of the maximum pixel value and minimum pixel value, the ratio being a contrast measure, and multiplying the contrast measure with a mean of the pixel values in the sub-image resulting in a normalized and weighted edge detection strength of the subject sub-image;

compare the normalized edge detection strength of the subject sub-image to a threshold;

determine, based on the comparison, an edge is present in the subject sub-image;

calculate, based on the determinations of edges in the sub-images, an autofocus metric associated with the given position of the focus cell; and provide the autofocus metric together with autofocus metrics associated with other positions of the focus cell to focus video images.

18. The tangible non-transitory computer-readable storage medium of claim 17, wherein the computer readable instructions, when executed by one or more processors additionally cause the one or more processors to:

for each image taken during a focus sweep, crop a subject image into a region of interest;

reduce white noise of the region of interest resulting in a filtered image; and detect edges in the filtered image resulting in an edge detected image associated with a position of the focus cell in the focus sweep.

19. A system for focusing video images, automatically, based on images taken during a focus sweep in which a focus cell is repositioned for each of the images, the system comprising:

a memory having computer executable instructions thereupon;

at least one interface receiving an edge detected image from a focus sweep and an associated position of a focus cell in the focus sweep;

an autofocus engine coupled to the memory and the at least one interface, the computer executable instructions when executed by the autofocus engine cause the autofocus engine to:

divide the edge detected image into sub-images;

for each sub-image, calculate a normalized edge detection strength of a subject sub-image;

compare the normalized edge detection strength of the subject sub-image to a threshold;

determine, based on the comparison, an edge is present in the subject sub-image;

calculate, based on the determinations of edges in the sub-images, an autofocus metric associated with the given position of the focus cell;

provide the autofocus metric together with autofocus metrics associated with other positions of the focus cell to focus video images;

for each image taken during a focus sweep, crop a subject image into a region of interest;

reduce white noise of the region of interest resulting in a filtered image; and detect edges in the filtered image resulting in an edge detected image associated with a position of the focus cell in the focus sweep.

20. A tangible non-transitory computer-readable storage medium having computer readable instructions stored therein for focusing video images, automatically, based on images taken during a focus sweep in which a focus cell is repositioned for each of the images, which when executed by one or more processors cause the one or more processors to:

given an edge detected image from a focus sweep and an associated position of a focus cell in the focus sweep, dividing the edge detected image into sub-images;

for each sub-image, calculate a normalized edge detection strength of a subject sub-image;

compare the normalized edge detection strength of the subject sub-image to a threshold;

determine, based on the comparison, an edge is present in the subject sub-image;

calculate, based on the determinations of edges in the sub-images, an autofocus metric associated with the given position of the focus cell;
provide the autofocus metric together with autofocus metrics associated with other positions of the focus cell to focus video images;
for each image taken during a focus sweep, crop a subject image into a region of interest;
reduce white noise of the region of interest resulting in a filtered image; and
detect edges in the filtered image resulting in an edge detected image associated with a position of the focus cell in the focus sweep.

\* \* \* \* \*